(12) United States Patent
Braun et al.

(10) Patent No.: US 9,862,546 B2
(45) Date of Patent: Jan. 9, 2018

(54) CHAIN DRIVE FOR LINK CHAINS OF MINING CONVEYORS OR MINING EXTRACTION MACHINES

(71) Applicants: Dietrich Braun, Essen (DE); Eberhard Braun, Essen (DE)

(72) Inventors: Dietrich Braun, Essen (DE); Eberhard Braun, Essen (DE)

(*) Notice: Subject to any disclaimer, the term of this patent is extended or adjusted under 35 U.S.C. 154(b) by 163 days.

(21) Appl. No.: 14/888,102

(22) PCT Filed: Apr. 30, 2013

(86) PCT No.: PCT/DE2013/100159
§ 371 (c)(1),
(2) Date: Oct. 30, 2015

(87) PCT Pub. No.: WO2014/177122
PCT Pub. Date: Nov. 6, 2014

(65) Prior Publication Data
US 2016/0152415 A1    Jun. 2, 2016

(51) Int. Cl.
*B65G 23/06* (2006.01)
*F16H 55/10* (2006.01)
*F16H 55/30* (2006.01)
*F16H 57/00* (2012.01)

(52) U.S. Cl.
CPC ............ *B65G 23/06* (2013.01); *F16H 55/10* (2013.01); *F16H 55/30* (2013.01); *F16H 57/0025* (2013.01)

(58) Field of Classification Search
CPC .......................... F16H 57/0025; B65G 23/06

USPC ............. 198/834; 474/168, 170, 174
See application file for complete search history.

(56) References Cited

U.S. PATENT DOCUMENTS

| 465,141 | A | | 12/1891 | McCray | |
|---|---|---|---|---|---|
| 1,630,313 | A | * | 5/1927 | Rorabeck | F16H 55/30 474/162 |
| 2,038,695 | A | | 4/1936 | Wilmot | |
| 3,205,022 | A | | 9/1965 | Eckert-Greifendorff | |
| 3,213,703 | A | * | 10/1965 | Fitzgerald | F16H 57/05 198/834 |
| 3,381,354 | A | * | 5/1968 | Krempa | B23F 15/00 29/525.02 |
| 3,805,631 | A | * | 4/1974 | Kerklies | B65G 23/00 198/834 |
| 4,233,853 | A | * | 11/1980 | Holz | F16H 55/36 474/185 |
| 4,308,019 | A | | 12/1981 | Horkey et al. | |

(Continued)

FOREIGN PATENT DOCUMENTS

| CH | 456259 | 5/1968 |
|---|---|---|
| DE | 4403108 | 9/1994 |

(Continued)

*Primary Examiner* — Douglas Hess
(74) *Attorney, Agent, or Firm* — Jacobson Holman, PLLC.

(57) ABSTRACT

A chain drive for a link chain of mining conveyors or mining extraction machines, in particular for scraper chain conveyors, includes a drive shaft. The drive power or the drive torque is introduced into the link chain by chain tooth elements. The chain tooth elements are set directly in the drive shaft in seats. For that purpose, the chain tooth elements have a lower coupling portion for interlocking engagement in the seats in the drive shaft. Accordingly, a separate chain wheel is unnecessary.

11 Claims, 1 Drawing Sheet

(56) References Cited

U.S. PATENT DOCUMENTS

| | | | | |
|---|---|---|---|---|
| 5,000,235 A * | 3/1991 | Jourdan | ............... | B65B 55/24 |
| | | | | 141/129 |
| 5,947,265 A * | 9/1999 | Merten | ............... | B65G 23/06 |
| | | | | 198/834 |
| 6,190,276 B1 * | 2/2001 | Eisenbarth | ............ | B65G 23/06 |
| | | | | 29/447 |
| 7,604,113 B2 * | 10/2009 | Pluszynski | ............ | B65G 23/06 |
| | | | | 198/834 |
| 8,490,779 B2 * | 7/2013 | Schurer | ............... | B65G 23/06 |
| | | | | 198/834 |
| 8,844,711 B2 * | 9/2014 | Kruger | ............... | B65G 23/06 |
| | | | | 198/834 |
| 8,887,901 B2 * | 11/2014 | Cox | ................ | B65G 23/06 |
| | | | | 198/834 |
| 9,476,495 B2 * | 10/2016 | Blackmur | ............. | F16H 55/30 |

FOREIGN PATENT DOCUMENTS

| | | |
|---|---|---|
| EP | 0172922 | 3/1986 |
| EP | 0505019 | 9/1992 |

* cited by examiner

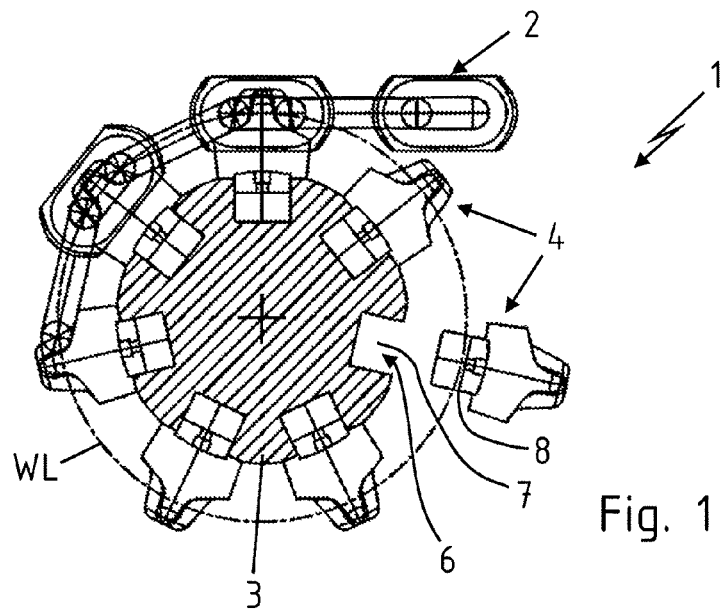
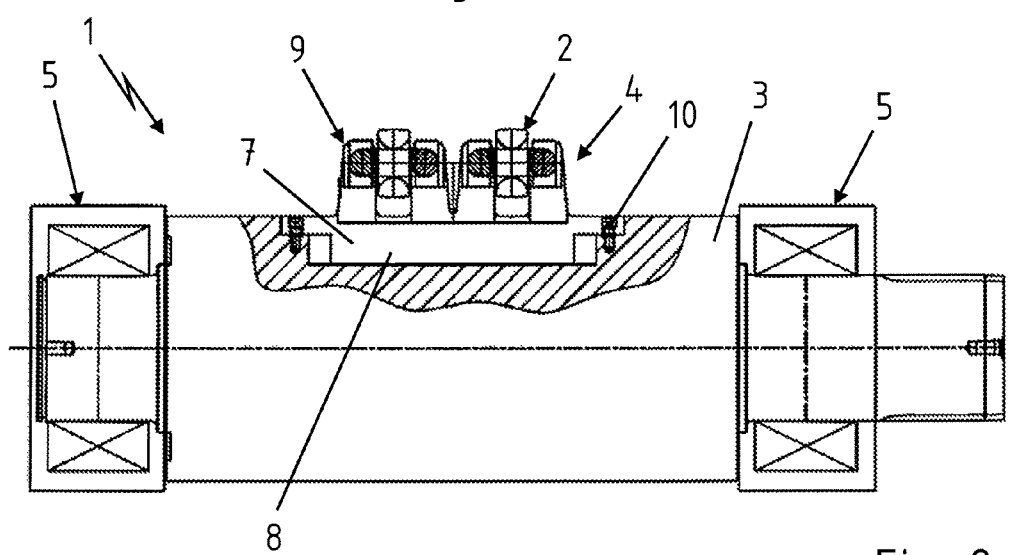
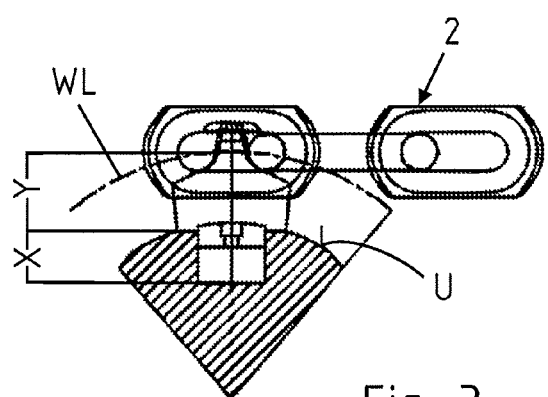

CHAIN DRIVE FOR LINK CHAINS OF MINING CONVEYORS OR MINING EXTRACTION MACHINES

CROSS-REFERENCE TO RELATED APPLICATION

This application is a national stage of PCT/DE2013/100159, filed Apr. 30, 2013, and published in German.

BACKGROUND OF THE INVENTION

1. Field of Invention

The invention relates to a chain drive for link chains of mining conveyors or mining extraction machines, in particular for scraper chain conveyors, with a drive shaft and sprocket tooth bodies.

2. Description of the Prior Art

Chain drives are used in mining operations, especially in chain conveyors, in particular scraper chain conveyors, and for powering mining extraction machines, especially coal plows and the like.

Chain conveyors are continuous conveyors and are the preferred means of conveyance, especially in the hard coal mining industry. The material to be conveyed is in this case moved by carriers (scrapers), which are fastened to electric motor-driven endless chains, in a conveyor trough.

A scraper chain conveyor is mainly composed of a drive station, the channel line, a one-, two- or three-part chain with carriers, a return station with auxiliary drive, with a shifting unit and the anchoring stations. Scraper chain conveyors are operated with high-strength chains. To drive the chain belts (chains with scrapers), the drive torque is delivered from the motor via a shaft in the sprocket mounted on the shaft. The sprocket transfers the tangential force to the chain via an interlocking mechanism.

Depending on the drive power and gear ratio installed on the conveyor, a chain must be chosen which has the required tensile strength. Stronger chains have larger dimensions and a longer pitch. Consequently, they run on a larger pitch circle around the sprocket. It is therefore advantageous, on the same shaft of a machine frame, to have the option of fitting several different shapes of sprocket to each chain as appropriate.

For drives for mining conveyors, a small sprocket diameter is required for reasons of space, resulting in the use of six or seven teeth on the circumference of a sprocket. Within this pitch circle diameter, there is only limited space for installation of the shaft cross-section and the sprocket. The drive shaft in particular however is subjected to a heavy load due to torsion (drive) and bending (tensile force on chain) and therefore needs to have a cross-section which ensures a sufficiently high shaft strength. Similarly, the chain teeth on the sprocket are subjected to a heavy bending load due to the tensile forces exerted on the chain. Therefore, the load-bearing surface must have a sufficiently high strength.

For scraper chain conveyors for heavy mining use, especially those with multi-chain drives, the chain is mounted as a removable part on the shaft in order to allow a worn sprocket to be replaced. The sprocket has the necessary form-fitting contours to allow it to interlock with the chain permanently incorporated into its outer circumference. The sprocket may consist of two halves which are positioned and screwed info place as half-shells around the shaft. The advantage of this is that the sprockets can be changed with the shaft installed. A disadvantage is that the screwing into place of the sprocket halves requires very strong screws which must be tightened with heavy tools (torque amplifier).

In another known embodiment, the sprocket is composed of a ring body which is mounted on the shaft. In the event of disassembly, the whole shaft with its load and the chain resting upon it must be removed from the machine frame and a bearing must be disassembled at one end of the shaft. The chain rings with internal teeth for torque absorption are also very expensive.

Generally, it should be noted that the screw connection of the sprocket halves with each other and the sprocket on the shaft is problematic, especially for very strong mining chains with wire diameters of up to 60 mm and maximum tensile forces of 4,500 kN to 5,000 kN. The necessary screws require a large amount of space for installation and therefore a minimum width of the sprocket. This makes it difficult to deliver the required torque. The disassembly and reassembly of the sprockets requires the removal of the shaft and is time-consuming. The necessary interruptions to operations lead to a loss of conveyor function.

When used with powerful drives, the link chains are subjected to exceptionally high stresses. As a result, the sprockets, especially the interlocking components (chain teeth, chain recesses) of the sprocket, are subject to a high degree of wear, due to rubbing of the chain links on the interlocking components, meaning that regular replacement is required. In the prior art, replaceable teeth solutions are known. Here, the sprocket or a sprocket base body is equipped with replaceable interlocking components, especially the chain sprocket teeth or tooth bodies.

Such proposals are known from EP 0 505 019 B1, CH 456 259 A, as well as DE 44 03 108 B4. Comparable solutions are published in U.S. Pat. No. 4,308,019 A and U.S. Pat. No. 2,038,895 A.

What all these proposals have in common is that replaceable interlocking components, in the form of teeth or tooth pairs, or sprocket tooth bodies more generally, are attached to the circumference of the sprocket. In this respect, different forms of execution are known. The sprocket tooth bodies can be installed in seats around the circumference of the sprocket and screwed into place. The stability of the teeth to prevent them tipping over due to the tensile forces exerted by the chain is achieved by screws, which press down the base of the tooth onto the surface of the sprocket. The screw connection is aligned with the center of the sprocket and forms the lowest point of attachment to the material of the sprocket.

Furthermore, the sprocket tooth bodies can also be fastened by pressing of the teeth into recesses on the upper surface of the chain sprocket. They are fastened by screws or bolts parallel to the direction of the shaft. The stability of the teeth to prevent them tipping over due to the tensile forces exerted by the chain is achieved by applying the base of the tooth to the surface of the sprocket. Furthermore, the sprocket tooth bodies can also be fastened in place by lateral overlapping of the sprocket disc. They are fastened by screws or bolts parallel to the direction of the shaft. During operation, these are subjected to high shear stresses due to the tensile forces exerted by the chain.

In addition, from U.S. Pat. No. 485,141 A, a chain drive for a link chain is known from the domain of mining conveyors. The conveying system demonstrated has at least one sprocket tooth body, which is coupled to a drive shaft. In addition, the sprocket tooth bodies can be set into seats in the drive shaft.

Generally speaking, the known replaceable teeth solutions for single-chain drives of a lighter construction are usable.

However, it has not been possible to implement such solutions for high-performance applications, especially not for scraper chain conveyors, and they are also not technologically suited for such uses.

SUMMARY OF THE INVENTION

The purpose of the invention is, starting from the prior art, to provide a high-performance chain drive for link chains of mining conveyors or mining extraction machines, in particular for scraper chain conveyors, which is optimized for operational use.

This solution which fulfills this purpose consists of a chain drive with the features associated therewith as described herein.

The measure that is at the core of the invention is that the sprocket tooth bodies are set directly into seats on the drive shaft.

Advantageous refinements and developments of the basic concept of the invention are also described herein.

The shaft is directly used to drive the link chain or the chain belt. The need for a sprocket as an intermediary component is eliminated. The vacant space previously used for installation of the sprocket is used to increase the shaft diameter. In the chain drive of the invention, a drive shaft with a larger diameter compared to conventional known constructions is therefore used.

The replaceable sprocket tooth bodies are inserted directly or immediately into the seats on the drive shaft.

The sprocket tooth bodies have a lower coupling section for engagement in the seats. The seats are preferably formed by grooves. To this end, deep grooves are milled into the drive shaft. This is possible because the present invention eliminates the need for a separate sprocket. The vacated space will be used in part for the formation of the grooves.

The teeth arranged in a row (two in single-chain, four in double-chain operation) are combined into a rack, in other words several sprocket tooth bodies in a row form a rack. Thereby, the distances and positions of sprocket tooth bodies in relation to each other are kept exact.

The connection between the sprocket tooth bodies or the coupling section of the sprocket tooth body and a seat is made by interlocking and/or force-fitting with a tight fit. This ensures that the sprocket tooth bodies transmit the forces delivered to the link chain without the need for any additional force-transmitting connecting elements. The sprocket tooth bodies are only secured in the seats by fasteners. The fasteners form a protective mechanism against loss.

This is useful in the event of loss of pretension of the coupling sections in the seats as a result of harsh operating conditions. For this reason, the sprocket tooth bodies are secured laterally in the seats by small screws. The screws do not penetrate deep into the shaft material. The shaft cross-section is thus not weakened or not significantly weakened.

Worn sprocket tooth bodies can easily, quickly and inexpensively be removed and replaced. The replaceable sprocket tooth bodies can be replaced with the shaft installed. Special tools are not required to do this, as large, hard-to-tighten screws can be dispensed with.

In the context of the invention, a drive shaft for chains with different pitches can be used. For this purpose, other sprocket tooth bodies or racks matched to the respective chain are used. The racks are preferably produced in one piece.

The elimination of the need for a separate sprocket makes it possible to make seats in the drive shaft despite the small amount of space for installation. The seats have a depth that ensures that the sprocket tooth bodies or the lower coupling sections of the sprocket tooth bodies are held in place securely with a snug fit and without any play. The seats have a correspondingly large depth. The sprocket tooth bodies are inserted into the seats with their coupling sections. The part of the sprocket tooth body protruding in relation to the circumference of the drive shaft has a free tooth height. This free tooth height is measured between the outer circumference of the drive shaft and the line of action of a driven link chain.

According to the invention, a ratio of seat depth to free tooth height of between 1:1 and 1:2.5 is envisaged. This ensures the necessary stability of the sprocket tooth bodies with their coupling sections in the seats, as well as the reliable delivery of force from the drive shaft via the sprocket tooth bodies into the link chain. In the deep seats or grooves, the sprocket tooth bodies or racks are securely seated in place without the need for additional force-transmitting connecting elements. Tensile forces on the chain of 5,000 kN and the resulting bending forces are transmitted securely. A ratio of seat depth to free tooth height of between 1:1 and 1:2 is particularly preferable.

BRIEF DESCRIPTION OF THE DRAWINGS

Further advantages and advantageous embodiments of the chain drive according to the invention arise from the claims and the embodiment described below with reference to the drawing figures. The following are shown:

FIG. 1 is a vertical cross-section through a chain drive according to the invention;

FIG. 2 shows a side view of the chain drive, in a partially cut-away view and

FIG. 3 shows a detail of the chain drive with the presentation of a circular segment of the drive shaft with the sprocket tooth bodies and engaged link chain.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Based on FIGS. 1 to 3, a chain drive 1 according to the invention is explained. The chain drive 1 is used to drive a link chain 2 of a scraper chain conveyor.

The chain drive 1 comprises a drive shaft 3 and sprocket tooth bodies 4 arranged on its circumference. The drive shaft 3 is supported by bearings 5 in a machine frame, not shown here.

As can be seen in FIG. 1, a total of seven sprocket tooth bodies 4 are envisaged in the embodiment represented here. The sprocket tooth bodies 4 are set into seats 8 in the drive shaft 3.

The seats 6 are formed by deep grooves 7 milled into the drive shaft 3. The sprocket tooth bodies 4 each have a lower coupling section 8 for engagement into a seat 6. The coupling sections 8 form a foot at the base of the sprocket tooth body by means of which the sprocket tooth body 4 is inserted into the groove 7. The connection is formed without any play by means of a tight fit with the groove 7. The deep grooves 7 with a tight fit ensure that the inserted sprocket tooth bodies 4 are able to transfer the forces to the link chain 2 without the need for any additional force-transmitting connecting elements.

FIG. 3 shows a seat 6 with a depth X. The sprocket tooth body 4 is inserted into the seat 6 with its coupling section 8. The upper part of sprocket tooth body 4 is facing towards the circumference of the drive shaft. The sprocket tooth body 4 has a free tooth height Y. The free tooth height Y is measured between the outer circumference U of the drive shaft 3 and the line of action WL of the link chain 2 running around the drive shaft 3 via the sprocket tooth bodies 4. The ratio of the depth X to free tooth height Y is between 1:1 and 1:2.5, and preferably between 1:1 and 1:2. This ensures that the sprocket tooth body 4 is stably and securely held in place in the seats 6.

Power-transmission and -delivery is carried out from the drive shaft 3 to the link chain 2 via the sprocket tooth bodies 4.

FIG. 2 further illustrates that a plurality of sprocket tooth bodies 4 are arranged in a row in the longitudinal direction of the drive shaft 3 form a rack 9. The sprocket tooth bodies 4 or the rack 9 is secured on the left and right by fasteners 10 in the seats 6. Small screws are used as fasteners 10. The screws do not penetrate deep into the shaft material, so that the shaft cross-section is not disadvantageously weakened thereby.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

NUMERALS

1—chain drive
2—link chain
3—drive shaft
4—sprocket tooth bodies
5—bearing
6—seats
7—groove
8—coupling section
9—rack
10—fasteners
X—depth of 6
Y—tooth height of 4
U—circumference
WL—line of action

What is claimed is:

1. A chain drive for link chains of mining conveyors or mining extraction machines, in particular for scraper chain conveyors, comprising a drive shaft and sprocket tooth bodies, whereby the sprocket tooth bodies can be set in seats in the drive shaft, the seats having a depth (X) and the sprocket tooth bodies having a free tooth height (Y), whereby the free tooth height (Y) is measured between an outer circumference (U) of the drive shaft and a line of action (WL) of a driven link chain and a ratio of the depth (X) to the free tooth height (Y) is between 1:1 and 1:2.5.

2. The chain drive according to claim 1, wherein the sprocket tooth bodies have a lower coupling section for engaging in the seats.

3. The chain drive according to claim 1, wherein the seats are formed by grooves.

4. The chain drive according to claim 1, wherein a plurality of the sprocket tooth bodies in a row form a rack.

5. The chain drive according to claim 4, wherein the rack is produced in one piece.

6. The chain drive according to claim 1, wherein the sprocket tooth bodies are secured in the seats by fasteners.

7. The chain drive according to claim 1, wherein the ratio is between 1:1 and 1:2.

8. A chain drive for a link chain, said chain drive comprising:
a drive shaft having a plurality of seats each with a depth (X); and
a corresponding plurality of sprocket tooth bodies each having a free tooth height (Y), the sprocket tooth bodies being positioned in a corresponding one of the seats in the drive shaft,
the free tooth height (Y) representing a distance between an outer circumference (U) of the drive shaft and a line of action (WL) of a driven link chain, and
a ratio of the depth (X) to the free tooth height (Y) being between 1:1 and 1:2.5.

9. The chain drive according to claim 8, wherein the chain drive is configured for use with a mining conveyor or a mining extraction machine.

10. The chain drive according to claim 9, wherein the chain drive is configured for use with a scraper chain conveyor.

11. The chain drive according to claim 8, wherein the ratio is between 1:1 and 1:2.

* * * * *